Jan. 22, 1924.　　　　　　　　　　　　　　　　　　1,481,712

F. P. HUCKINS

SHIP UNLOADING APPARATUS

Filed Jan. 29, 1923　　　5 Sheets-Sheet 1

INVENTOR:
Frank P. Huckins
BY Harry T. Williams
ATTORNEY

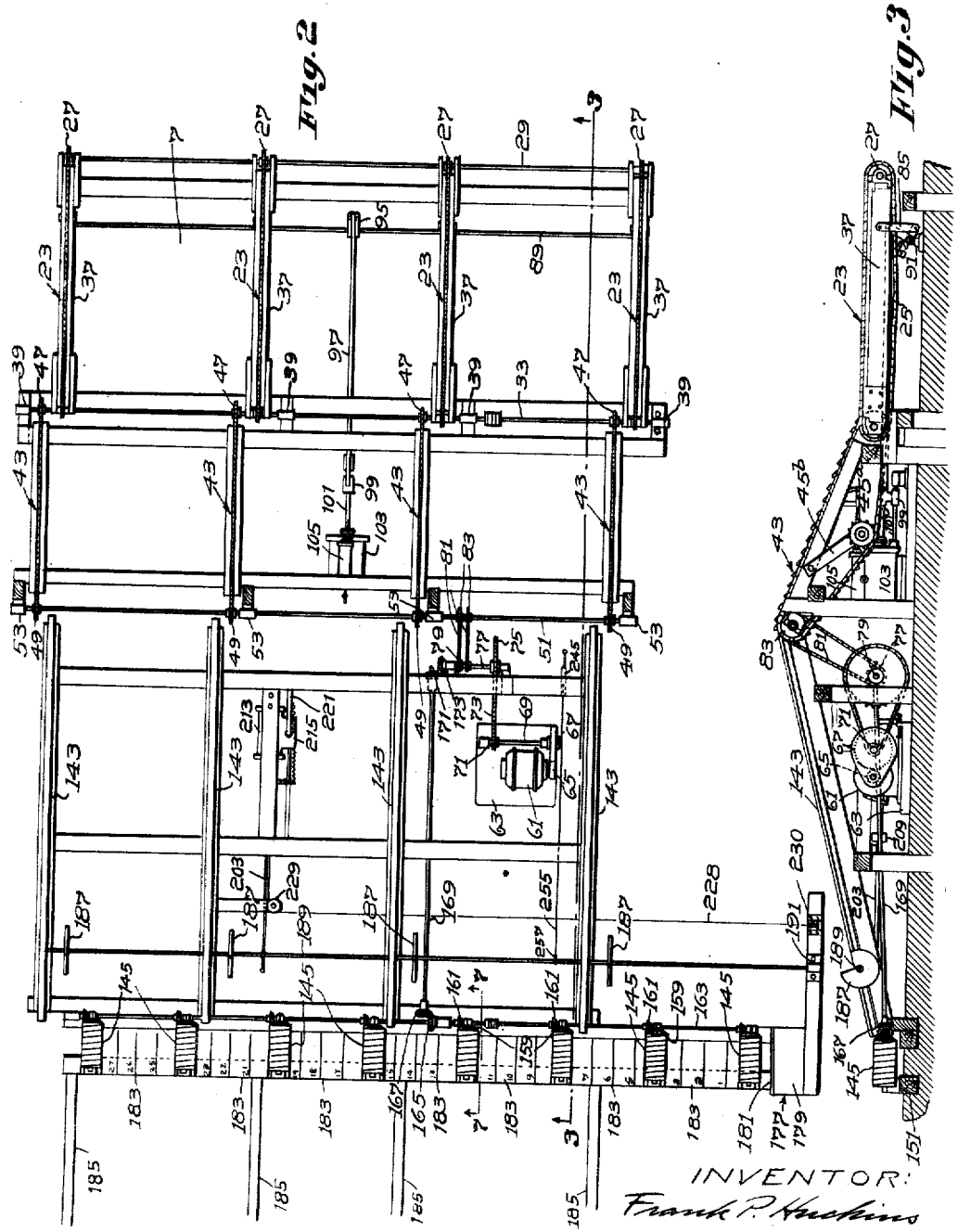

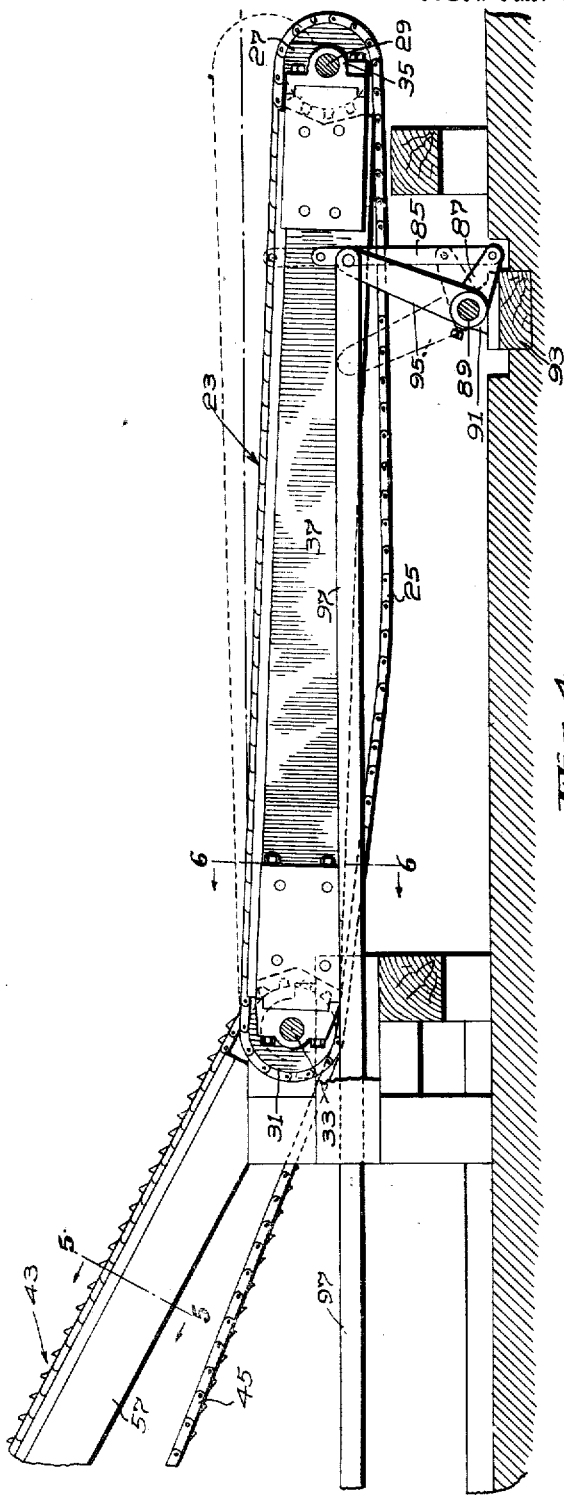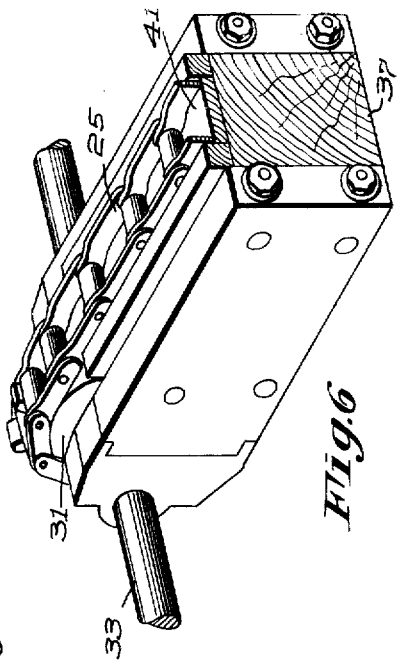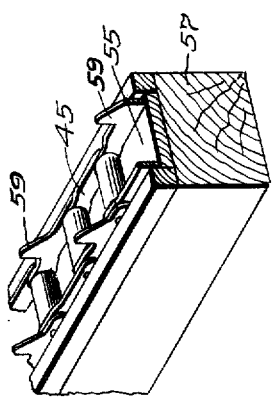

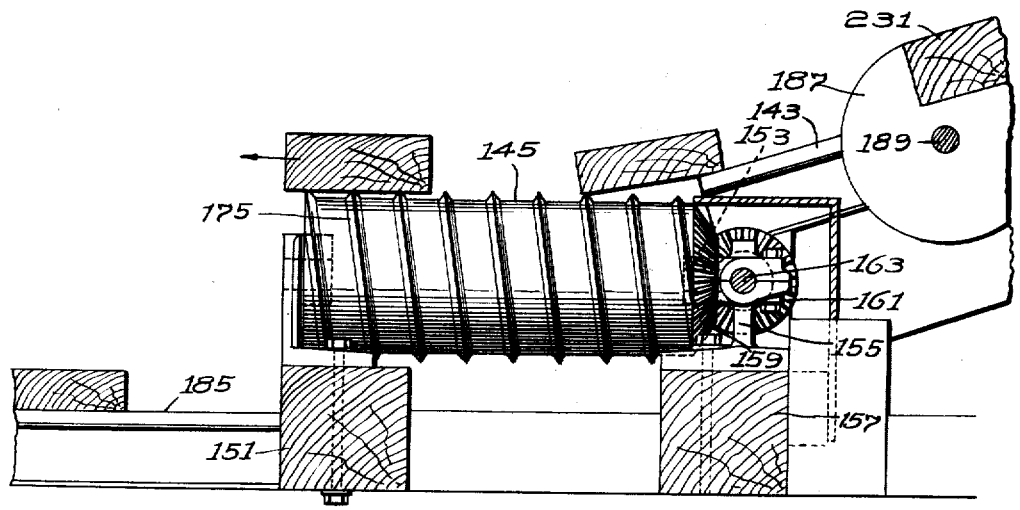

Jan. 22, 1924.  1,481,712
F. P. HUCKINS
SHIP UNLOADING APPARATUS
Filed Jan. 29, 1923    5 Sheets-Sheet 5
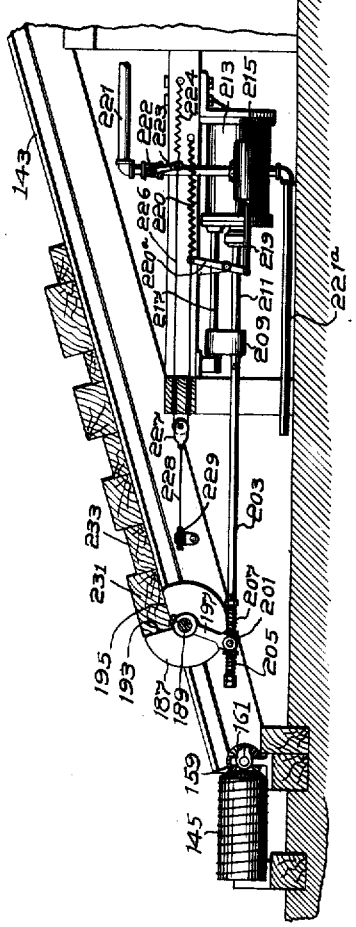
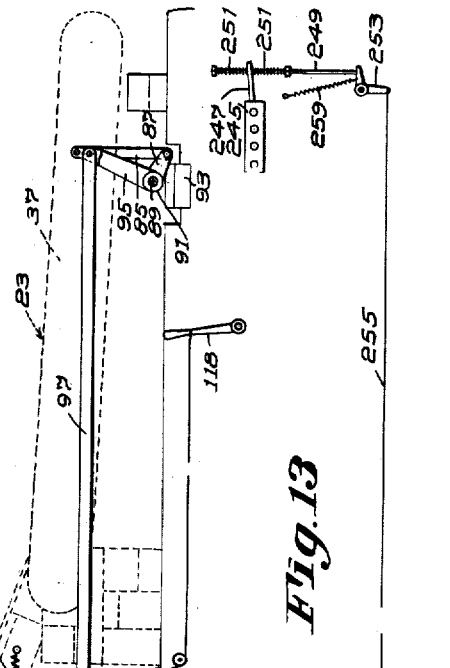
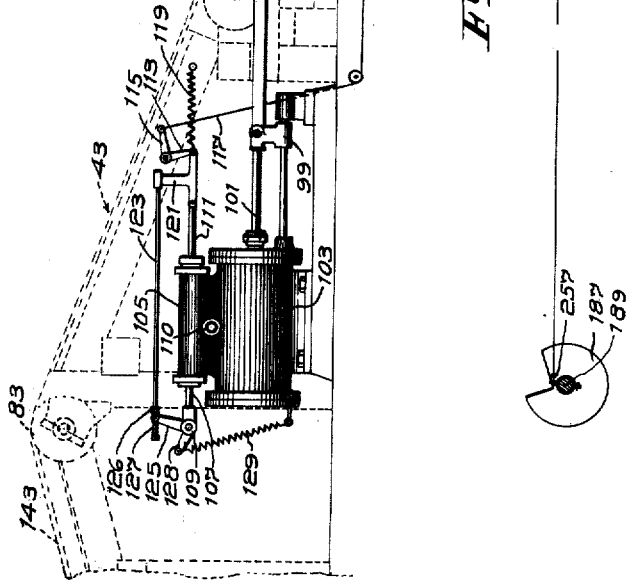
INVENTOR:
Frank P. Huckins
BY Henry T. Williams
ATTORNEY.

Patented Jan. 22, 1924.

1,481,712

UNITED STATES PATENT OFFICE.

FRANK P. HUCKINS, OF NEWTON, MASSACHUSETTS.

SHIP-UNLOADING APPARATUS.

Application filed January 29, 1923. Serial No. 615,459.

*To all whom it may concern:*

Be it known that I, FRANK P. HUCKINS, a citizen of the United States, residing at Newton, in the county of Middlesex and State of Massachusetts, have invented certain new and useful Improvements in Ship-Unloading Apparatus, of which the following is a specification.

The invention to be hereinafter described relates to apparatus for unloading lumber from ships.

Heretofore in unloading lumber from ships, it has been customary to draw the lumber from the ship through its bow lumber ports onto the dock. Then the lumber has been measured by laying along each piece, a pole which is marked with numbers representing feet. The measurement is marked down in a tally book, and then the lumber is drawn away by tractors or horses and piled for storage.

The work of unloading, measuring, and drawing the lumber away requires the services of a number of men, and these operations result in considerable confusion. The consequence is that the lumber is not quickly unloaded, and the departure of the ship from port is objectionably delayed.

One of the objects of the present invention, therefore, is to provide efficient apparatus whereby lumber may be unloaded from a ship easily and expeditiously. In carrying the invention into practical effect in the present instance, the lumber is drawn from the ship onto a platform on the dock. Then the pieces of lumber are conveyed in a direction transverse to the length thereof to a measuring apparatus including a scale marked with graduations and numbers representing feet. The pieces of lumber are automatically transferred individually and progressively to this measuring device and placed in proper relation with respect to the scale, in order that the lengths of the pieces may be read therefrom. The invention also contemplates the provision of means for automatically counting the measured pieces of lumber.

With the aforesaid and other objects in view, the character of the invention will be best understood by reference to the following description of one good form thereof, shown in the accompanying drawings, wherein:

Fig. 2 is a plan of the apparatus shown in Fig. 1;

Fig. 3 is a vertical longitudinal section taken on line 3—3 of Fig. 2;

Figure 1:
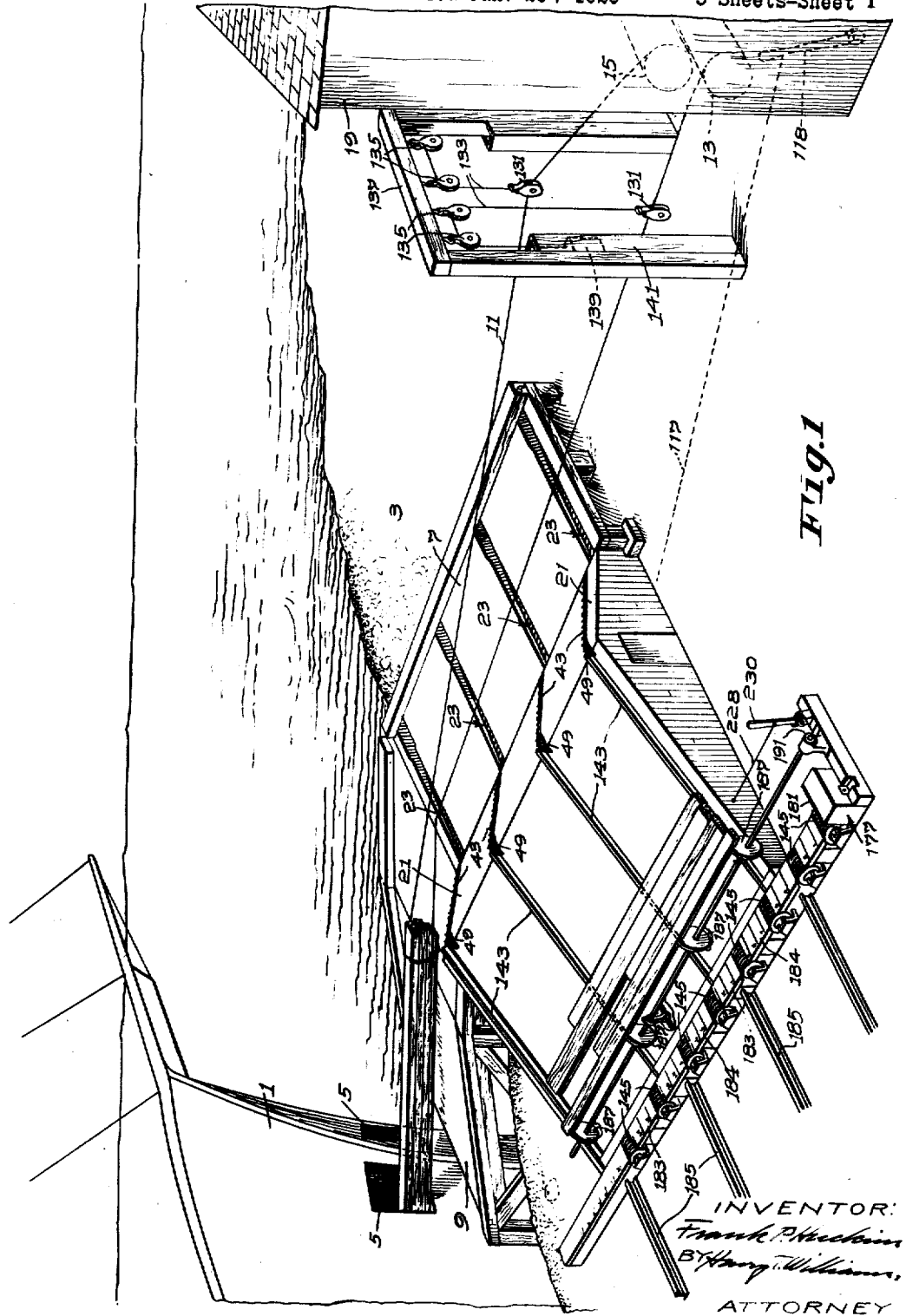
Figure 1 is a perspective view of apparatus embodying the invention and illustrating its relation to a ship at a dock.

Fig. 4 on an enlarged scale is a vertical section through the transfer platform and a portion of the ramp conveyer;

Fig. 5 on an enlarged scale is a sectional detail taken on line 5—5 of Fig. 4;

Fig. 6 on an enlarged scale is a perspective sectional detail taken on line 6—6 of Fig. 4;

Fig. 7 on an enlarged scale is a vertical transverse section through the measuring device taken on line 7—7 of Fig. 2;

Fig. 8 on an enlarged scale is a side elevation of an end portion of the measuring device;

Figs. 9 and 10 are views showing the arrangement of the messenger and cargo chains;

Fig. 11 on an enlarged scale is an elevation of the mechanism for operating the device for unloading or transferring the pieces of lumber to the measuring device;

Fig. 12 on an enlarged scale is a side elevation of a portion of the apparatus, showing a mechanism for raising and lowering the arms carrying the conveyers at the transfer platform, parts associated with the mechanism being shown in dotted lines; and Fig. 13 is an elevation of the mechanism for counting the pieces of lumber.

Referring to the drawings, 1 designates a ship at a dock 3, the ship being provided with usual lumber ports 5 through which the lumber may be drawn from the ship.

Mounted on the dock is a transfer platform 7, and leading from the bow of the ship thereto is an inclined platform 9.

To draw the lumber from the two bow ports 5, a messenger or cable 11 (Figs. 1, 9 and 10) may be provided. This messenger has one end attached to a windlass 13, and is led across the platforms 7 and 9 through one of the lumber ports. The messenger passes thence about a pulley 14 mounted in the ship, and out through the other lumber port, and back over the platforms 7 and 9, the other end of the messenger being attached to a windlass 15. This messenger is provided with a pair of usual cargo chains 17, each being adapted to be wrapped about several pieces of lumber, and the construction of the messenger is such that when one of the windlasses is operated to pull one of the cargo chains and the bundle of lumber secured thereby from one of the ports, the other cargo chain is drawn back through the other port into the ship to be in readiness for attachment to another bundle of lumber to be drawn from the ship on operation of the windlass 15.

The windlasses 13 and 15 may be mounted in a house 19, and may be driven by any suitable source of power under the control of the operator, who will so operate the windlasses as to alternately draw bundles of lumber from the port and starboard lumber ports of the ship onto the transfer platform, where the pieces of lumber will lie in substantial parallel relation after being released from the cargo chains.

It is desirable that the pieces may be transferred or fed laterally from the transfer platform to a ramp 21. To accomplish this, in the present instance of the invention, the transfer platform is provided with a plurality of conveyers 23 (Figs. 1 to 4), each of said conveyers comprising a sprocket chain 25 carried by outer sprocket wheels 27 on a shaft 29 and inner sprocket wheels 31 on a shaft 33. The outer shaft is journalled in bearings 35 carried by rock arms 37 fulcrumed on the inner shaft 33 which is journalled in bearings 39 mounted on the frame-work supporting the transfer platform. The upper runs of the conveyers 23 travel in and are supported by guideways 41 (Fig. 6) on the upper edges of the arms 37.

These arms are mounted in slots extending transversely of the transfer platform, and are adapted to be rocked by means to be described on the inner shaft 33 as a fulcrum, to bring the upper runs of the sprocket chains above or beneath the surface of the transfer platform. When the upper runs of the sprocket chains are above the surface of the platform, they are in active positions for feeding the lumber transversely from the platform, and when the upper runs are down beneath the surface of the platform, they are out of the way of the lumber being drawn from the ship onto the platform.

It is desirable that the lumber leaving the transfer platform shall be fed upward onto the ramp 21. To accomplish this, in the present instance of the invention, the incline of the ramp leading from the transfer platform is provided with a plurality of conveyers 43 (Figs. 1 to 5), each comprising a sprocket chain 45 carried by lower sprocket wheels 47 mounted on the inner shaft 33 referred to, and upper sprocket wheels 49 fast on a shaft 51 journalled in bearings 53 suitably mounted on the framework of the ramp. To take up slack in the sprocket chains 45, idler sprocket wheels 45ᵃ may engage the lower runs of said chains and be carried by swing arms 45ᵇ having their upper ends pivotally connected to the frame of the ramp. Preferably all of the lower sprocket wheels 47 are mounted loose on the shaft 33, with the exception of one of said sprocket wheels, which is keyed to said shaft, and the sprocket chain cooperating with the later sprocket wheel serves to drive the shaft 33 from the upper shaft 51.

The ramp conveyers 43 are mounted in transverse slots in the ramp incline, and the upper runs of the sprocket chains are supported in guideways 55 (Fig. 5) carried by inclined joists 57. The conveyer chains 45 may have lugs 59 (Fig. 5) thereon at intervals and adapted to engage the edges of the pieces of lumber in feeding the same up the incline of the ramp.

Suitable means may be provided for rotating the upper shaft 51 of the ramp conveyer. In the present instance, for this purpose an electric motor 61 (Figs. 2 and 3) is mounted on a base 63 beneath the ramp. The motor has a pinion 65 meshing with a gear 67 on a shaft 69 journalled in suitable bearings mounted on the base 63. A small sprocket wheel 71 fast on the shaft 69 is connected by a sprocket chain 73 with a large sprocket wheel 75 fast on a shaft 77 journalled in suitable bearings mounted on the frame-work of the ramp. Fast on the shaft 77 are a pair of sprocket wheels 79 connected by sprocket chains 81 with sprocket wheels 83 fast on the upper shaft 51 referred to, for the ramp conveyers.

The construction is such that the motor and transmission described will drive the ramp conveyers 43, and one of the latter in turn will drive the transfer conveyers 23, and thereby feed the lumber from the transfer platform up the incline of the ramp to the top thereof.

Suitable means may be provided for rocking the conveyer arms 37 to bring the upper runs of their conveyers to positions above or beneath the surface of the transfer platform. This means in the present instance of the invention, comprises links 85 (Figs. 3, 4 and 12) having their upper ends pivotally connected to arms 87 fast on a rock shaft 89 journalled in bearings 91 mounted on a base 93 beneath the transfer platform. Fast on the rock shaft 89 is a crank 95 connected by a rod 97 with a cross head 99 connected in turn to the stem 101 of a piston in a steam cylinder 103 provided with a valve 105. Steam is conducted to the valve 105 through a pipe 107 provided with a valve 105. Steam is conducted to the valve 105 through a pipe 107 provided with a throttle valve 109, and steam is conducted from the valve through the exhaust pipe 110.

The valve 105 is provided with a steam 111 connected to one arm 113 of a bell-crank, the opposite arm 115 of which is connected to a wire 117 which may extend to the operator's house 19, said wire being provided with a handle 118. A coil spring 119 has one end connected to the arm 113 of the bell-crank, and its opposite end anchored.

The valve stem 111 is provided with a block 121 connected to one end of a rod 123. The opposite end of this rod projects through an arm 125 of a bell-crank, said rod being provided with a collar 126 fast thereon and engaging one side of the arm, the opposite side of said arm being engaged by a coil spring 127 encircling the rod. The bell-crank also has an arm 128 connected to one end of a coil spring 129, the opposite end of which is anchored. The coil spring 119 referred to, is relatively heavy as compared to the coil spring 129.

The construction is such that when the operator desires to elevate the conveyer arms 37 to bring the upper runs thereof to position above the surface of the tranfer platform, he grasps the handle 118 and pulls the same, thereby rocking the bell-crank 115, and through the stem 111 shifts the valve 105 in position to admit steam to the right hand end of the cylinder 103. This movement of the stem 111 also shifts the rod 123 to the left, thereby rocking the bell-crank arm 125 to open the throttle valve 109, the movement of said arm being assisted by the coil spring 129. The open throttle valve will admit steam into the cylinder 103 and cause its piston to pull the connecting rod 97 to the left, and the latter will operate through the crank 95 to rock the shaft 89. The latter in turn will operate through the arms 87 and links 85 to move the conveyer arms 37 up so as to bring the upper runs of the conveyers up above the surface of the transfer platform.

After the conveyers have transferred the lumber from the platform to the ramp, the operator releases the handle 118. This allows the spring 119 to shift the valve 105 and the rod 123 to the right, thereby closing the throttle valve 109 and cutting off the supply of steam to the cylinder. The spring 129 delays closing of the throttle valve 109 until after shifting of the valve 105. This operation allows the conveyer arms to drop under the influence of gravity, so as to bring the upper runs of the conveyers down beneath the surface of the transfer platform, where they will be out of the way of the next supply of lumber drawn from the ship onto the platform.

It is desirable that when either of the cargo chains is not active in drawing lumber onto the transfer platform, that the cable for such chain shall be elevated up from the transfer platform, where it will not interfere with feed of lumber transversely of the transfer platform. To this end the cables may pass over pulleys 131 (Fig. 1) connected to ends of wire rope 133 which pass over gide pulleys 135 supported by a frame 137 located intermediate the transfer platform and the operator's house 19. The opposite ends of said wire ropes are connected to counterweights 139 which slide in boxes 141 at the sides of the frame.

The construction is such that when either of the cables is slack and not active in drawing lumber onto the transfer platform, the counterweight for such cable will automatically lift the latter up from the transfer platform. On the other hand, when either of the cables is under tension and active in drawing lumber onto the transfer platform, the pull on the cable will draw the cable downward against the opposition of its counterweight.

Suitable means may be provided to conduct the lumber from the top of the ramp to the measuring device to be described. This means, in the present instance of the invention, comprises inclined rails 143 (Figs. 1, 2 and 3) mounted on the framework of the ramp and having an inclination such that the pieces of lumber will gravitate downward along said rails after delivery of the pieces to the upper ends of the rails by the ramp conveyers.

The measuring device, in the present instance of the invention, comprises a series of rollers 145 (Figs. 1, 2, 3, 7 and 8) provided with outer trunnions 147 journalled in open bearings in brackets 149 mounted on a beam 151. These rollers are also provided with inner trunnions 153 journalled in bearings in brackets 155 mounted on a beam 157.

On the inner end of each of the rollers is a bevel gear 159 meshing with a bevel gear 161 fast on a shaft 163 journalled in bearings in the brackets 155.

To rotate the shaft 163, a bevel gear 165 (Figs. 2 and 3) is mounted fast thereon and meshes with a bevel gear 167 fast on a shaft 169 journalled in suitable bearings and extending toward the countershaft 77 referred to. The shaft 169 has fast thereon a bevel gear 171 meshing with a bevel gear 173 fast on said shaft 77.

The construction is such that the motor 61 which serves to drive the ramp conveyers and transfer conveyers, will also serve to rotate the rollers 145 of the measuring device.

Each of the rollers may be provided with helical ribs 175 to automatically feed the pieces of lumber laterally from the rollers, as more fully hereinafter described.

At one end of the series of rollers 145 is an abutment 177 (Figs. 1, 2 and 8) comprising a block 179 mounted on the beams 151 and 157, and having a steel face plate 181, which may desirably be disposed at a slight angle with respect to a plane perpendicular to the lengths of said beams.

Mounted on the beam 151 between the rollers 145 are members 183 (Figs. 1 and 8) located in a plane somewhat beneath the level of the tops of the rollers, said members being marked with graduations and numbers representing feet, and said members collectively constituting a scale 184 extending from the abutment 177 along the series of rollers.

The construction is such that when a piece of lumber is deposited on the series of rollers, it is fed longitudinally of the scale until an end of the piece engages the abutment. Thereupon, the length of the piece may be readily read by reference to the numbered graduation registering with the opposite end of the piece.

After the end of the piece of lumber has been brought into engagement with the abutment, it will be fed in a direction transversely to the length of the piece off from the rollers by means of the helical ribs 175 referred to, on the rollers. These ribs will not feed the piece of lumber laterally until after the end thereof has been brought into frictional enagement with the abutment, on the same principle that a nut will not be fed longitudinally of a rotated screw unless the nut is confined against rotation.

The pieces of lumber on leaving the measuring device may be received by suitable rails 185 (Fig. 1), and may be drawn therefrom by suitable tractors to the point desired.

It is desirable to provide means for transferring the pieces one-by-one from the inclined rails 143 to the measuring device. This means, in the present instance of the invention, comprises a series of elements conveniently in the form of disks 187 (Figs. 1, 2, 3, 7, 9 and 11) mounted on a rock shaft 189 journalled in bearings 191 mounted on the frame of the apparatus. Each of these disks has a notch 193 therein provided with a side 195 of predetermined length, such, for example, as 8 inches. The construction is such that the notch will serve to transfer pieces varying from six inches to fifteen inches in width.

Suitable means may be provided automatically to rock the shaft 189 and the disks 187 thereon. This means, in the present instance of the invention, comprises an arm 197 (Fig. 11) mounted fast on the shaft 189 adjacent a disk 187. The outer end of the arm 197 is pivotally connected to a spool 201 loose on a connecting rod 203 and yieldingly confined between coil springs 205 and 207 on said rod.

The rod 203 is connected to a cross head 209 connected in turn to the stem 211 of a piston mounted in a cylinder 213 provided with a usual piston valve 215. The cross head 209 may be carried by a suitable guide 217.

The valve 215 is provided with a stem 219 urged to the right by a coil spring 220 having one end anchored and its opposite end secured to a lever 220ª connected to the stem 219.

Steam is conducted to the valve through a pipe 221 provided with a throttle valve 222, and steam is conducted from the valve through the exhaust pipe 221ª. The throttle valve is operated by an arm 223 connected to one end of a coil spring 224, the opposite end of the latter being anchored. A wire rope 226 has one end connected to the arm 223, is guided about a pulley 227, and has its opposite end connected to the lever 220ª. The pulley 227 is connected to one end of a wire rope 228 guided about a pulley 229 (Figs. 2 and 11), and the opposite end of the rope 228 is provided with a hand lever 230 (Fig. 1) mounted adjacent the block 179.

The construction is such that when it is desired to transfer a piece of lumber from the ramp to the measuring device, the operator grasps the hand lever 230 and pulls the rope 228, and since the coil spring 224 is relatively light as compared to the coil spring 220, first the throttle valve will be opened, and then the valve 215 will be shifted to admit steam into the left end of the cylinder 213. This will cause the piston 212, rod 211, cross head 209 and rod 203 to move to the right, and the latter will rock the arm 197 and the shaft 189, thereby rocking the notched disks to transfer a piece of lumber from the ramp to the measuring device.

On release of the handle 230, the coil spring 220 will shift the valve 215 to the left, thereby admitting steam to the right end of the cylinder 213. This will rock the notched disks back to their original position where the notches thereof will be in readiness to receive the next piece of lumber to be unloaded from the ramp onto the measuring device. After the valve has been shifted for this purpose, the lighter coil spring 224 will become effective to rock the arm 223 and close the throttle valve 222, thereby cutting off the supply of steam to the cylinder.

Each time that the notched disks are rocked in a contraclockwise direction, they will transfer a piece of lumber, such, for example, as the piece 231 (Figs. 7 and 11) from the rails 143 onto the rollers of the measuring device. As the disks rock to transfer the piece, the curved peripheral portions of the disks will rise in front of the next adjacent piece 233 and prevent said piece and those on the rails back of it from passing down to the measuring device. Thus, the rocking of the disks will serve progressively to feed the pieces of lumber one-by-one from the rails to the measuring device. The rails 143 may be sufficiently long to enable a supply of pieces of lumber always to be in readiness for transfer to the measuring device, and the length of said rails may be sufficient always to provide a free space to receive pieces from the ramp conveyers and without delay to the feed of lumber to the transfer platform and to the ramp conveyers.

Suitable means may be provided for counting the pieces of lumber as they are measured. This means, in the present instance of the invention, comprises a counter 245 (Figs. 2 and 13) of usual well known construction, and therefore, unnecessary to show and describe in detail herein. This counter may be located wherever convenient and in the present instance, it is mounted underneath the ramp. The counter has a rock arm 247 through which projects a rod 249 provided with coil springs 251 at opposite sides of the arm 247. The rod is connected to an arm of a suitably mounted bell-crank 253, the other arm of which is connected by a wire 255 with a screw eye 257 secured to the rock shaft 189. A coil spring 259 has one end anchored and its opposite end secured to the bell-crank 253.

The construction is such that when the disk 187 is rocked in a contra-clockwise direction to transfer a piece of lumber, it will operate through the wire 255, bell-crank 253, rod 249 and one of the springs 251 to shift the arm 247 of the counter and advance the same an increment. When the disk 187 is rocked in a clockwise direction, the coil spring 259 will be effective to operate through the bell-crank 253, rod 249 and the other spring 251 to shift the member 247 in the opposite direction in readiness for the next step movement of the counter.

The ramp may have its inclines closed by suitable roofing to form a protective housing for the mechanism beneath the same.

The operation of the apparatus will be readily understood. The lumber is drawn in bundles by the messenger onto the transfer platform, and after release of the cargo chains from the bundles, the operator pulls the handle 118 to elevate the conveyer arms to bring the upper runs of the conveyers above the surface of the transfer platform.

The conveyers 23 and the ramp conveyers 43 which may be continuously driven will then operate to transfer the lumber from the platform to the top of the ramp and deliver the pieces of lumber to the upper ends of the rails 143. The pieces will slide down said rails until arrested by engagement with the unloading disks.

The unloading disks will progressively transfer the pieces one-by-one from the rails onto the measuring device.

The rollers of the measuring device will feed each piece longitudinally until limited by engagement of an end thereof with an abutment 177. Thereupon, the relation of the opposite end of the piece to the scale may be observed, and the length of the piece determined. Then the helical ribs of the continuously driven rollers will operate to feed the piece from the measuring device to the rails 185, and the pieces accumulating thereon may be drawn by tractors to the point desired.

The counter will be advanced a step each time a piece of lumber is transferred onto the measuring device, and will thereby register the number of pieces measured.

By my invention, apparatus is provided which will unload lumber from a ship and measure and count the number of pieces, and the operations may be performed with economy in time and labor.

While the apparatus has been described more particularly with reference to unloading lumber from a ship, it may be employed to unload other articles resembling lumber in form.

It will be understood that the invention is not limited to the specific embodiment shown, and that various deviations may be made therefrom without departing from the spirit and scope of the appended claims.

What is claimed is:

1. Apparatus of the character described, comprising, in combination, a platform, means for drawing lumber from a ship onto the platform, a conveyer for carrying the lumber from the platform, means for moving the conveyer to positions above and beneath the upper surface of the platform, a ramp conveyer for carrying the lumber from the platform conveyer, an inclined support for receiving the lumber from the ramp conveyer, means for measuring the lumber, and means for transferring the lumber piece-by-piece from the support to the measuring means.

2. Apparatus of the character described, comprising, in combination, means for measuring lumber, an inclined support adjacent the measuring means, and means for delivering lumber to the upper portion of the inclined support, that the lumber may gravitate down the latter toward the measuring means.

3. Apparatus of the character described, comprising, in combination, means for measuring lumber comprising an abutment, means for feeding the lumber in the direction of the length thereof toward said abutment, means for indicating the length of the lumber after its engagement with the abutment; and means for conveying the lumber to the measuring means.

4. Apparatus of the character described, comprising, in combination, an abutment, a series of rollers for feeding lumber in the direction of the length thereof toward said abutment and means adjacent said rollers for indicating the length of the lumber after the latter has engaged the abutment.

5. Apparatus of the character described, comprising, in combination, an abutment, a series of rollers for feeding lumber in the direction of the length thereof to the abutment, and means for indicating the length of the lumber, said rollers having provision for automatically feeding the lumber transversely off from said rollers when the lumber has been brought into engagement with the abutment.

6. Apparatus of the character described, comprising, in combination, an abutment, a series of rollers for feeding lumber in the direction of the length thereof toward said abutment, and means for indicating the length of the lumber, said rollers having helical ribs for automatically feeding the lumber transversely off from said rollers after the lumber has been brought into engagement with the abutment.

7. Apparatus of the character described, comprising, in combination, a scale having graduations and numbers for measuring length, an abutment at one end of said scale, and means for feeding lumber longitudinally into engagement with said abutment, that the length of the lumber may be read from the graduations on said scale, said means having provision for feeding the lumber transversely away from the scale after the lumber has been brought in engagement with the abutment.

8. Apparatus of the character described, comprising, in combination, means for indicating the length of lumber, means for progressively feeding pieces of lumber into position to be individually measured by said indicating means, and means for automatically feeding the pieces of lumber away from said indicating means.

9. Apparatus of the character described, comprising, in combination, an abutment, rollers for automatically feeding lumber longitudinally into engagement with said abutment, means for rotating said rollers, and a scale extending from the abutment along the rollers for indicating the length of the lumber on engagement of the latter with the abutment.

10. Apparatus of the character described, comprising, in combination, a measuring device, a support adjacent the measuring device adapted to receive lumber, means to deliver lumber onto the support, and disks having notches for receiving the lumber from the support and transferring the same to the measuring device.

11. Apparatus of the character described, comprising, in combination, a measuring device, a support adjacent the measuring device adapted to receive lumber, and notched elements adapted to receive rotary motion to transfer the lumber from the support to the measuring device.

12. Apparatus of the character described, comprising, in combination, a measuring device, a support adjacent the measuring device adapted to receive lumber, a shaft, and a plurality of elements mounted on the shaft for transferring the lumber piece-by-piece from the support to the measuring device.

13. Apparatus of the character described, comprising, in combination, a measuring device, a support adjacent the measuring device adapted to receive lumber, transfer elements, and means to operate said elements to cause the same to transfer pieces of lumber progressively from the support to the measuring device.

14. Apparatus of the character described, comprising, in combination, a measuring device, an inclined support adjacent the measuring device, means to deliver lumber to the support that it may slide down the same toward the measuring device, and means for transferring the lumber piece-by-piece from the lower end of the inclined support to the measuring device.

15. Apparatus of the character described, comprising, in combination, a support, windlasses having cables for drawing lumber longitudinally onto said support, means for feeding the lumber transversely off from the support, and means automatically to hold the cables up away from the support out of the path of the lumber when fed transversely from the support.

16. Apparatus of the character described, comprising, in combination, a support, a windlass having a cable for drawing lumber longitudinally onto said support, means for feeding the lumber transversely off from the support, and means for automatically lifting the cable up away from the support to avoid interference with the lumber when fed transversely from the support.

17. Apparatus of the character described, comprising, in combination, a support, a windlass and a cable for drawing lumber longitudinally onto said support, means for feeding the lumber transversely along the support, a pulley receiving the cable, a flexible member connected to said pulley, means including a pulley to support the flexible member, and a weight connected to said member for automatically lifting the cable up from the support to avoid interference with the lumber when fed transversely of said support.

18. Apparatus of the character described, comprising, in combination, a platform, means for measuring pieces of lumber, a ramp between the platform and the measuring means, means for drawing pieces of lumber from a ship onto the platform, means for conveying the pieces of lumber from the platform to the top of the ramp, means for transferring the pieces of lumber individually from the ramp to the measuring means, and means for automatically counting the number of pieces transferred to the measuring means.

19. Apparatus of the character described, comprising, in combination, a platform, carriers, conveyers mounted on said carriers for feeding lumber off from said platform, a cylinder and its piston, a valve for the cylinder, means to conduct fluid to said valve, a throttle valve for the conducting means, connections between the piston and the carriers for raising and lowering the latter on movements of the piston in the cylinder, manually operable means for opening the throttle valve and shifting the cylinder valve, and means automatically to shift the cylinder valve and close the throttle valve on release of the manually operable means.

20. Apparatus of the character described, comprising, in combination, a ramp, a platform adjacent said ramp, conveyers for the platform, means for drawing lumber from a ship onto the platform, and means for adjusting the platform conveyers to a position beneath the surface of the platform to avoid interference with the lumber drawn thereon, said adjusting means having provision for raising the platform conveyers above the surface of the platform, that the platform conveyers may be effective to feed the lumber to the ramp conveyers.

21. Apparatus of the character described, comprising, in combination, a measuring device, means to feed lumber toward the measuring device, and means for transferring the lumber from the feeding means to the measuring device comprising elements for engagement with the lumber, a cylinder and its piston, connections between the piston and said elements, a valve for the cylinder, means to conduct motive fluid to the valve, a throttle valve for the fluid conducting means, manually operable means for shifting the cylinder valve and opening the throttle valve, and means automatically to shift the cylinder valve and close the throttle valve on release of the manually operable means.

22. Apparatus of the character described, comprising, in combination, a measuring device, means to feed lumber to the measuring device, and means to transfer the lumber piece-by-piece from the feeding means to the measuring device comprising elements for engagement with the lumber, and means for rocking said elements in opposite directions including manually operable means for initiating the rocking movements of said elements to transfer the lumber and automatic means to initiate return rocking movements of said elements to positions in readiness for the next transfer operation.

23. Apparatus of the character described, comprising, in combination, a support, a measuring device, means for feeding the lumber from the support to the measuring device including conveyers extending across the support, and means for adjusting said conveyers to positions above and beneath the surface of the support comprising manually operable means for initiating the raising of the conveyers, and automatic means for initiating the lowering of the conveyers on release of the manually operable means.

FRANK P. HUCKINS.

Certificate of Correction.

It is hereby certified that in Letters Patent No. 1,481,712, granted January 22, 1924, upon the application of Frank P. Huckins, of Newton, Massachusetts, for an improvement in "Ship-Unloading Apparatus," errors appear in the printed specification requiring correction as follows: Page 2, line 117, after the word "to" insert the words *the arms 37 adjacent the free ends thereof, and their lower ends pivotally connected to;* same page, lines 124 to 126, strike out the words and period " Steam is conducted to the valve 105 through a pipe 107 provided with a valve 105."; page 3, lines 23 and 24, for the word "position" read *positions;* line 24, for the misspelled word "tranfer" read *transfer*, and line 69, for "gide" read *guide;* and that the said Letters Patent should be read with these corrections therein that the same may conform to the record of the case in the Patent Office.

Signed and sealed this 18th day of March, A. D., 1924.

[SEAL.]

KARL FENNING,
*Acting Commissioner of Patents.*